(12) United States Patent
Wright

(10) Patent No.: US 7,635,302 B2
(45) Date of Patent: *Dec. 22, 2009

(54) MULTIPLE PRICING IN A LOTTERY BASED ON VARIABLE RATIOS

(75) Inventor: Robert J. Wright, Irving, TX (US)

(73) Assignee: Integrated Group Assets Inc., Dallas, TX (US)

( * ) Notice: Subject to any disclaimer, the term of this patent is extended or adjusted under 35 U.S.C. 154(b) by 1257 days.

This patent is subject to a terminal disclaimer.

(21) Appl. No.: 10/876,390

(22) Filed: Jun. 25, 2004

(65) Prior Publication Data

US 2005/0165619 A1    Jul. 28, 2005

Related U.S. Application Data

(63) Continuation-in-part of application No. 10/766,676, filed on Jan. 27, 2004, now Pat. No. 6,935,948.

(51) Int. Cl.
*A63F 13/00* (2006.01)

(52) U.S. Cl. .................. 463/17; 463/26; 463/27; 273/139

(58) Field of Classification Search ............. 463/17, 463/26, 27; 273/138, 139
See application file for complete search history.

(56) References Cited

U.S. PATENT DOCUMENTS 4,157,829 A    6/1979    Goldman et al.
4,494,197 A    1/1985    Troy et al.
4,652,998 A *  3/1987    Koza et al. ............ 463/26
4,689,742 A    8/1987    Troy et al.

(Continued)

FOREIGN PATENT DOCUMENTS

WO    WO 01/18759    3/2001

(Continued)

OTHER PUBLICATIONS

Patel, Freny, "Lottery Firms Seek COver For Jackpots," rediff.com, Jul. 4, 2003.*

(Continued)

*Primary Examiner*—Dmitry Suhol
*Assistant Examiner*—Joshua P. Wert
(74) *Attorney, Agent, or Firm*—Patent Ingenuity, P.C.; Samuel K. Simpson

(57) ABSTRACT

A method of multiple pricing for a predetermined or progressive single jackpot in a single lottery game is disclosed. For instance, a lottery ticket purchased for one dollar can result in a ten million dollar win, a lottery ticket purchased for two dollars can result in a twenty million dollar win, a lottery ticket purchased for three dollars can result in a thirty million dollar win, etc. Further, different winnings increments can be used. For instance, the three-dollar ticket can result in a forty million dollar win to induce the purchase of higher-priced tickets. The potential distributions can be established according to a constant ratio, a variable ratio, or a combination of a constant ratio and a variable ratio. In addition, the lottery prize can also be a variable prize that progressively increases with a percentage of each ticket sold. The prizes are won from a single pool.

29 Claims, 9 Drawing Sheets

U.S. PATENT DOCUMENTS

| | | | | |
|---|---|---|---|---|
| 4,991,848 | A * | 2/1991 | Greenwood et al. | 463/21 |
| 5,083,784 | A * | 1/1992 | Nilssen | 705/14 |
| 5,223,698 | A * | 6/1993 | Kapur | 235/375 |
| 5,282,620 | A * | 2/1994 | Keesee | 463/20 |
| 5,286,023 | A * | 2/1994 | Wood | 463/20 |
| 5,380,007 | A * | 1/1995 | Travis et al. | 463/18 |
| RE35,864 | E * | 7/1998 | Weingardt | 463/28 |
| 5,851,149 | A * | 12/1998 | Xidos et al. | 463/42 |
| 5,855,514 | A * | 1/1999 | Kamille | 463/17 |
| 6,017,032 | A * | 1/2000 | Grippo et al. | 273/138.1 |
| 6,105,007 | A * | 8/2000 | Norris | 705/38 |
| 6,168,521 | B1 * | 1/2001 | Luciano et al. | 463/18 |
| 6,296,569 | B1 * | 10/2001 | Congello, Jr. | 463/17 |
| 6,371,855 | B1 * | 4/2002 | Gavriloff | 463/42 |
| 6,416,408 | B2 * | 7/2002 | Tracy et al. | 463/16 |
| 6,454,650 | B1 * | 9/2002 | Aronin | 463/17 |
| 6,527,175 | B1 * | 3/2003 | Dietz et al. | 235/381 |
| 6,554,710 | B1 * | 4/2003 | Olson | 463/42 |
| 6,572,106 | B2 * | 6/2003 | Alexoff | 273/138.1 |
| 6,648,753 | B1 * | 11/2003 | Tracy et al. | 463/16 |
| 6,692,354 | B2 * | 2/2004 | Tracy et al. | 463/16 |
| 6,840,857 | B2 * | 1/2005 | Ghela | 463/17 |
| 6,869,362 | B2 * | 3/2005 | Walker et al. | 463/25 |
| 6,887,152 | B2 * | 5/2005 | Stanek | 463/17 |
| 6,935,948 | B2 * | 8/2005 | Wright | 463/17 |
| 7,347,776 | B2 * | 3/2008 | Wright | 463/17 |
| 7,351,142 | B2 * | 4/2008 | Walker et al. | 463/17 |
| 2002/0180151 | A1 * | 12/2002 | Alexoff | 273/292 |
| 2003/0003984 | A1 * | 1/2003 | Petruzzi | 463/17 |
| 2003/0045339 | A1 * | 3/2003 | Ghela | 463/17 |
| 2003/0050109 | A1 * | 3/2003 | Caro et al. | 463/17 |
| 2003/0069059 | A1 * | 4/2003 | Stanek | 463/17 |
| 2003/0080507 | A1 * | 5/2003 | Higginson | 273/269 |
| 2003/0154094 | A1 * | 8/2003 | Bredemeier et al. | 705/1 |
| 2003/0186735 | A1 * | 10/2003 | Byrne | 463/16 |
| 2003/0187765 | A1 * | 10/2003 | Sgaraglio | 705/35 |
| 2003/0190959 | A1 * | 10/2003 | Olson | 463/42 |
| 2003/0226028 | A1 * | 12/2003 | Kra | 713/200 |
| 2003/0232651 | A1 * | 12/2003 | Huard et al. | 463/42 |
| 2004/0058726 | A1 * | 3/2004 | Klugman | 463/17 |
| 2004/0088203 | A1 * | 5/2004 | Kakuwa et al. | 705/4 |
| 2004/0103011 | A1 * | 5/2004 | Hatano et al. | 705/4 |
| 2004/0110554 | A1 * | 6/2004 | Bromfield | 463/17 |
| 2004/0110556 | A1 * | 6/2004 | Bromfield | 463/25 |
| 2004/0116176 | A1 * | 6/2004 | Tulley et al. | 463/17 |
| 2004/0139032 | A1 * | 7/2004 | Rowan | 705/80 |
| 2004/0172317 | A1 * | 9/2004 | Davis et al. | 705/7 |
| 2004/0173965 | A1 * | 9/2004 | Stanek | 273/269 |
| 2004/0185931 | A1 * | 9/2004 | Lowell et al. | 463/17 |
| 2005/0164768 | A1 * | 7/2005 | Wright | 463/17 |
| 2005/0164770 | A1 * | 7/2005 | Wright | 463/17 |
| 2005/0165619 | A1 * | 7/2005 | Wright | 705/1 |
| 2005/0176490 | A1 * | 8/2005 | Wright | 463/17 |
| 2006/0064330 | A1 * | 3/2006 | Sumino et al. | 705/4 |

FOREIGN PATENT DOCUMENTS

| | | |
|---|---|---|
| WO | WO 01/42968 | 6/2001 |
| WO | WO 02/07018 | 1/2002 |
| WO | WO 02/27424 | 4/2002 |
| WO | WO 03/091958 | 11/2003 |

OTHER PUBLICATIONS

McQueen, Patricia A. "Lotteries offer add-on games attached to existing online options." *International Gaming & Wagering Business*, Apr. 2004, pp. 22, 26-27.

European Examination Report dated Jul. 17, 2009 for European Patent Application No. 05712446.3-1238.

European Examination Report dated Jul. 17, 2009 for European Patent Application No. 04777229.8-1238.

* cited by examiner

MULTIPLE PRICING IN A LOTTERY BASED ON VARIABLE RATIOS

RELATED APPLICATIONS

This application is a Continuation-In-Part application of U.S. patent application Ser. No. 10/766,676, filed on Jan. 27, 2004 now U.S. Pat. No. 6,935,948, entitled MULTIPLE PRICING SHARED SINGLE JACKPOT IN A LOTTERY by Robert J. Wright, which is hereby incorporated by reference in its entirety.

BACKGROUND

1. Field

A system and method are disclosed which generally relate to gaming, and more specifically to lotteries.

2. General Background

A lottery is generally a distribution of tokens such that a subset of the distributed tokens may win a prize. The token can be in the form of a ticket. One of the most popular forms of lottery involves the distribution of lottery tickets. Each lottery ticket includes a lottery number. After the lottery tickets have been distributed to the lottery ticket holders, the winning number is chosen. The usual method of selecting the winning number involves a random selection of the winning number. A random number generator can be used to randomly select the winning number. Some lottery systems require the ticket to have the entire number that is randomly selected while other lottery systems require the ticket to have a superset of an ordered sequence of numbers that are randomly selected.

Lotteries as normally used by jurisdictions reflect a parimutuel model in which the prize is funded by a portion of the ticket sales. One potential problem with the pari-mutuel model is that a sufficient number of tickets need to be sold in order to provide a reasonable lottery prize. However, interest in purchasing lottery tickets is generally stimulated only when the prize becomes substantial. For instance, a large number of lottery tickets are purchased in a $10 million dollar lottery, but a disproportionately large number of lottery tickets are purchased in a $50 million dollar lottery.

In addition, traditional lotteries sell tickets for one price. If there are multiple winners of a jackpot, the winners split the jackpot prize.

SUMMARY

In one aspect, a method is disclosed for inducing the purchase of a high price ticket in a multi-priced shared lottery. The method provides a first price category in which a plurality of first price category lottery tickets can be purchased. A first distribution is established that can be won with the lottery tickets in the plurality of first-price category lottery tickets having a winning lottery number. A second price category is provided in which a plurality of second price category lottery tickets can be purchased. Further, a second distribution is established that can be won with the lottery tickets in the plurality of second-price category lottery tickets having a winning lottery number. The second prize is determined so that a first association between the first distribution and the first price category has a variable ratio with a second association between the second distribution and the second price category.

In another aspect, a method is disclosed for inducing the purchase of a highest priced ticket in a multi-priced shared lottery. The method provides a first price category in which a plurality of first-price category lottery tickets can be purchased. Further, a first distribution is established that can be won with the lottery tickets in the plurality of first-price category lottery tickets having a winning lottery number. A second price category is provided in which a plurality of second price category lottery tickets can be purchased. In addition, a second distribution is established that can be won with the lottery tickets in the plurality of second price category lottery tickets having a winning lottery number. Further, the second distribution is determined so that a first association between the first distribution and the first price category has a variable ratio with a second association between the second distribution and the second price category. The winning lottery number is randomly selected. A first price category intra-shared distribution of the first distribution is provided if at least one of the lottery tickets in the plurality of first price category lottery tickets has a winning number. In this instance, the first category is the only price category having a winning ticket. Further, in this instance, each of the winning tickets in the plurality of first price category lottery tickets shares the first distribution according to a first price category intra-sharing distribution formula.

A second price category intra-shared distribution of the second distribution of the prize is provided if at least one of the lottery tickets in the plurality of second price category lottery tickets has a winning number. In this instance, the second category is the only price category having a winning ticket. Further, each of the winning tickets in the plurality of second price category lottery tickets shares the second distribution according to a second price category intra-sharing distribution formula.

A divided first price category intra-shared distribution of the first distribution, a divided second price category intra-shared distribution of the second distribution, and an inter-shared distribution of the first distribution are provided if at least one of the lottery tickets in the plurality of first price category lottery tickets has a winning number and if at least one of the lottery tickets in the plurality of second price category lottery tickets has a winning number. In this instance, each of the winning tickets in the plurality of first price category lottery tickets shares the first distribution according to the divided first price category intra-sharing distribution formula. In addition, in this instance, each of the winning tickets in the plurality of second price category lottery tickets shares the second distribution according to the divided second price category intra-sharing distribution formula. Further, in this instance, each of the winning tickets in the plurality of the second price category lottery tickets shares the first distribution with each of the winning tickets in the plurality of the first price category lottery tickets according to an inter-sharing distribution formula.

BRIEF DESCRIPTION OF THE DRAWINGS

By way of example, reference will now be made to the accompanying drawings.

FIG. 10 illustrates a probabilistic software configuration that can be used with the probabilistic lottery system.

DETAILED DESCRIPTION OF THE INVENTION

Figure 1:
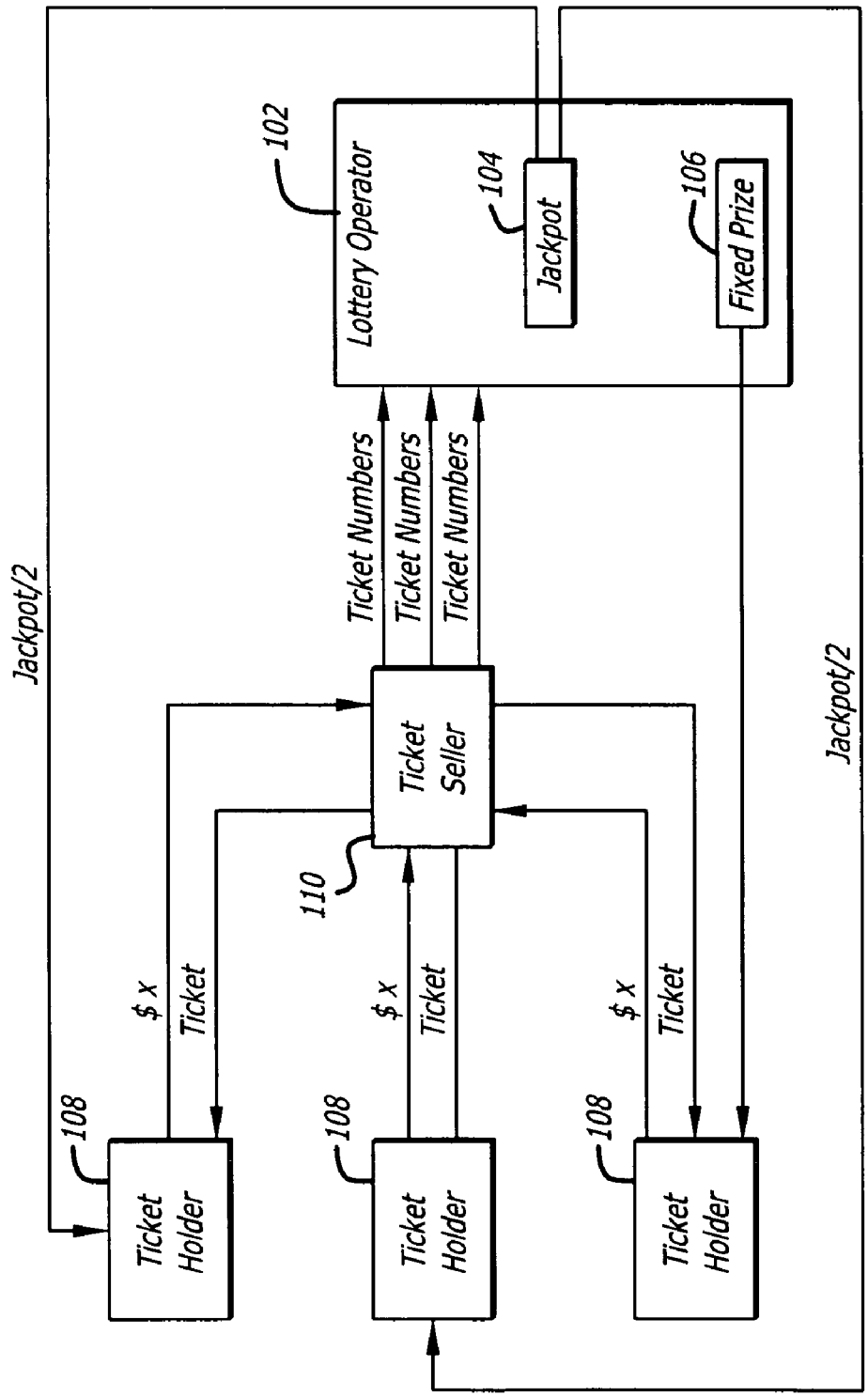
FIG. 1 illustrates a single priced lottery system that is based on a pari-mutuel model.

A method of multiple pricing for a predetermined single jackpot in a single lottery game is disclosed. For instance, a lottery ticket that is purchased for one dollar can result in a ten million dollar win, a lottery ticket that is purchased for two dollars can result in a twenty million dollar win, and a lottery ticket that is purchased for three dollars can result in a thirty million dollar win, etc. The difference in increments is not limited to a set increment. For instance, in the example above, a ten million dollar increment existed between the advertised winnings for each price category of tickets. However, any increment can be used. For instance, a lottery ticket that is purchased for one dollar can result in a ten million dollar win, a lottery ticket that is purchased for two dollars can result in a twenty million dollar win, a lottery ticket that is purchased for three dollars can result in a forty million dollar win, etc. In one embodiment, a larger increment can be used to induce purchase of a higher price ticket.

Each price category can be associated with a distribution of a jackpot. For instance, a one-dollar ticket can win twenty five percent of the jackpot, a two-dollar ticket can win fifty percent of the jackpot, and a three-dollar ticket can win one hundred percent of the jackpot. In another embodiment each price category can be associated with a distribution of the jackpot. In one embodiment, the actual winnings are not limited to the advertised winnings. The jackpot can increase with a percentage of each ticket sale being contributed to the jackpot. For instance, if the one-dollar ticket winner is the only winner, the one-dollar ticket winner can win twenty five percent of a larger jackpot than initially advertised. In effect, the one-dollar ticket winner is winning more than twenty five percent of the initial jackpot.

The prizes are won from a single pool. For instance, even if the revenues for the one dollar ticket do not cover the ten million dollar prize, the combined revenues of the one dollar and the two dollar tickets may cover the ten million dollar prize and vice versa. In one embodiment, a shared multiple-priced lottery game with a single pre-determined jackpot is disclosed. For example, a lottery player having a one-dollar ticket attempting to win ten million dollars and a lottery player having a two-dollar ticket attempting to win twenty million dollars can both win a prize. The lottery player having the one-dollar ticket will receive a portion of the ten million dollar prize and will have to share the other portion with the lottery player having the two-dollar ticket. Accordingly, the two-dollar ticket holder receives the remaining portion of the ten million dollars and an additional ten million dollars because the two-dollar ticket holder would have been entitled to twenty million dollars if the two-dollar ticket holder won the lottery alone. The shared multiple-priced lottery game is not limited to one-dollar and two-dollar tickets. For example, a three-dollar ticket could also be provided. The three-dollar ticket holder would share the lottery prize with the two-dollar ticket holder and the one-dollar ticket holder in a manner similar to that in which the two-dollar ticket holder shared the lottery prize with the one-dollar ticket holder.

The average revenue per ticket sold as a result of the multiple pricing structure can result in higher revenue than traditional single-priced lottery systems. A lottery may benefit by paying less to ticket holders that purchase the inexpensive tickets while at the same time attracting more ticket holders who will only play if the jackpot is large and are willing to spend more by purchasing higher priced tickets so as to give themselves the opportunity to win a larger jackpot. The multiple-priced system can be used independently or in conjunction with an entity that guarantees the winnings of the lottery.

In one embodiment, fixed prizes can be offered in addition to or without the jackpot prize. A fixed prize is a prize that is not shared. If a lottery player has the winning number for a fixed prize, the lottery player receives the entire fixed prize. If multiple lottery players have the winning numbers for the fixed prize, then multiple lottery players each receive the entire fixed prize without having to share the fixed prizes with the other players. The fixed prize is different from the jackpot prize in which multiple winners share the jackpot prize. The fixed prizes can be distributed in entirety to multiple players because the fixed prizes are generally much smaller than the jackpot prize. In one embodiment, the fixed prize can be the jackpot prize. Multiple players could win the jackpot prize without having to share the jackpot prize.

FIG. 1 illustrates a single-priced lottery system 100 that is based on a pari-mutuel model. A lottery operator 102 establishes the lottery. The lottery operator 102 can be a jurisdiction such as a country, state, province, city, town, municipality, or any division or department thereof. Further, the lottery operator 102 can be a private organization that a jurisdiction hires to coordinate the lottery. The lottery operator 102 can also be a private organization that is not hired by a jurisdiction. The coordination involved can include establishment, maintenance, operation and oversight and/or winnings determination.

The lottery operator 102 can advertise that a lottery has a prize. For example, the lottery operator 102 can advertise that the lottery prize will be a minimum of ten million dollars. The lottery operator 102 provides the lottery prize from a jackpot 104. In one embodiment, the jackpot 104 is a variable jackpot that increases through allocation of a portion of the ticket sales. The lottery operator 102 can also provide a fixed prize 106. In one embodiment, ticket holders 108 purchase tickets at a price of $x per ticket from a ticket seller 110. The ticket seller then sends the ticket numbers on each of the tickets to the lottery operator, typically through a computer network 102. If one of the ticket holders 108 wins the lottery, the lottery operator 102 disburses the jackpot 104 to the ticket holder 108. On the other hand, if multiple ticket holders 108 win the lottery, the multiple ticket holders with the winning tickets split the jackpot 104. For instance, FIG. 1 illustrates two ticket holders 108 winning the lottery. The lottery operator 102 then splits the jackpot 104 and distributes half of the jackpot to each of the ticket holders 108.

The lottery operator 102 can also distribute a fixed prize 106. A ticket holder 108 can win a fixed prize that the ticket holder 108 does not have to share with other ticket holders 108. For instance, if multiple ticket holders 108 won the fixed prize 106, the lottery operator 102 would distribute the fixed prize 106 in its entirety to each of the multiple ticket holders 108 that won the fixed prize 106. In one embodiment, the multiple pricing method and system can be applied to the fixed prize 106. The ticket holder 106 can qualify for the higher fixed prize 106 by purchasing a higher priced ticket.

In one embodiment, the lottery operator 102 can use a random number generator (not shown) to determine the winning number. In another embodiment, the lottery operator 102 can use a ball draw machine to randomly select the winning number.

One of the difficulties of the single-priced lottery system 100 is that the single-priced lottery system 100 does not optimize the amount spent by a customer and the size of the jackpot 104. Some ticket holders 108 may want to purchase a less expensive lottery ticket even if the associated prize is relatively small. Further, some ticket holders 108 may not wish to purchase a lottery ticket unless the jackpot 104 is very large. These ticket holders 108 may be willing to pay more for a lottery ticket that provides a larger prize. Further, some ticket holders 108 generally buy lottery tickets in almost any lottery regardless of the size of the jackpot 104. The single-priced lottery system 100 does not optimize the performance of a lottery since it does not create an optimal incentive for the customer to spend more and thereby increase the revenue of the lottery.

Figure 2:
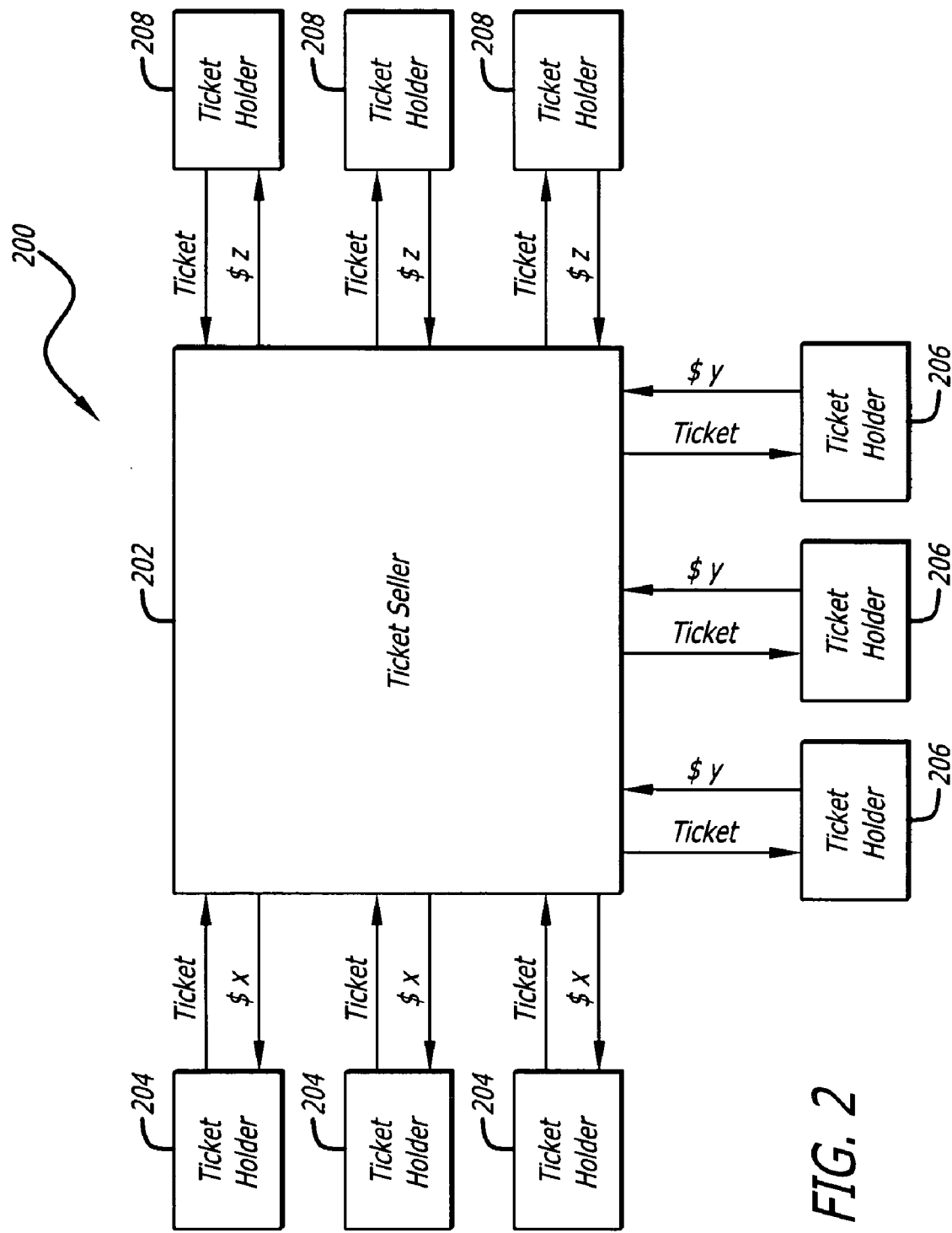
FIG. 2 illustrates a shared multiple-priced single-pool lottery system.

FIG. 2 illustrates a shared multiple-priced single-pool lottery system 200. A ticket seller 202 provides lottery tickets according to different price categories. A ticket holder 204 can purchase a lottery ticket in a first price category. For instance, the first price category can be lottery tickets purchased for $x. The first price category is associated with a first distribution of a lottery prize that can be won. For example, the ticket holder 204 may have purchased the lottery ticket for one dollar in order to win twenty five percent of the jackpot. In one embodiment, the advertised jackpot is increased with a percentage of ticket sales revenue. Therefore, the ticket holder 204 can win twenty five percent of a larger jackpot than initially advertised. In one embodiment, the jackpot is increased with a percentage of the revenue from each ticket sold. In other words, a minimum amount of ticket sales is not required for the contribution of ticket sales revenue into the jackpot 104. The addition of a percentage of ticket sales to the jackpot is a progressive jackpot. In essence, a variable prize is offered with a progressive jackpot. The prize can increase with each ticket sale. In one embodiment, the prize increases with a portion of the ticket sales. In another Embodiment, the progressive jackpot can be divided among multiple winners. In one embodiment, a minimum amount of ticket sales is not required. The lottery prize can be a variable prize from the outset. A percentage of each ticket sale can be contributed to the variable-prize jackpot.

In one embodiment, the progressive model can be applied so that each price category benefits. If the jackpot increases in size, potential winnings for each price category can increase because the jackpot increases.

In one embodiment, if the only winning lottery ticket or winning lottery tickets are in the first price category, then the first distribution is distributed according to a first price category intra-sharing distribution formula. In one embodiment, the first price category intra-sharing distribution formula requires an even distribution among all the winners in the first price category. In the example above, if two ticket holders 204 have winning ticket numbers, the two ticket holders 204 share the first distribution evenly. In the example, the first distribution of the prize was twenty five percent. Therefore, the two ticket holders 204 would each receive twelve and one half percent of the prize. In one embodiment, if the ticket holder 204 has the only winning ticket in the lottery, the first price category intra-sharing distribution formula provides the entirety of the first distribution of the prize to the ticket holder 204. In this example, the ticket holder 204 would receive twenty five percent of the prize. In one embodiment, the remaining seventy-five percent of the jackpot 104 would be rolled over to increase the prize for subsequent drawings.

In another embodiment, the first price category intra-sharing distribution formula can be weighted. In one embodiment, the intra-sharing distribution formula can be weighted in favor of the number of tickets purchased in the current drawing of the lottery. For example, if two ticket holders 204 are the only ticket winners in the lottery, one of the ticket holders, 204 may have purchased one hundred lottery tickets in the current drawing whereas the other one of the ticket holders 204 may have only purchased one lottery ticket in the current drawing. A weighting can be established so that the ticket holder 204 that purchased one hundred tickets in the current lottery can win, for example, twenty percent of the prize whereas the ticket holder 204 that purchased one ticket in the current lottery can win, for example, five percent of the prize.

In yet another embodiment, the first price category intra-sharing distribution can be weighted in favor of previous ticket purchases. For example, if two ticket holders 204 are the only ticket winners in the lottery, one of the ticket holders 204 may have purchased one hundred lottery tickets in previous lotteries whereas the other one of the ticket holders 204 may have purchased a lottery ticket for the first time. The first price category intra-sharing distribution formula can include a frequent lottery variable that would provide a larger portion of the first distribution to the ticket holder 204 that previously purchased one hundred tickets. For example, the ticket holder 204 that purchased one hundred tickets may receive twenty percent of the prize whereas the ticket holder 204 that only purchased one ticket may receive only five percent of the prize. This is only one example. The frequent lottery variable can also provide a small change. For instance, the ticket holder 204 that purchased one hundred tickets may receive thirteen percent of the prize and the thicket holder 204 that purchased one ticket may receive twelve percent prize. The lottery operator 102 may find that use of the frequent lottery variable provides more incentive to ticket holders 204 to participate in the lottery. The first price category intra-sharing distribution formula can be determined according to consumer demand. One of ordinary skill in the art will recognize that a variety of formulae can be used for weighting the distribution. The first price category intra-sharing distribution formula can be a variable, a ratio, etc.

In one embodiment, the lottery prize is a jackpot. In alternative embodiments, other types of prizes can be used. The prize is not limited to jackpots.

FIG. 2 also illustrates that a ticket holder 206 can purchase a lottery ticket in a second price category. For instance, the second price category can be lottery tickets purchased for $y. The second price category is associated with a second distribution of a lottery prize that can be won. For example, the ticket holder 206 may have purchased the lottery ticket for two dollars in order to win fifty percent of the jackpot. In one embodiment, if the only winning lottery ticket or winning lottery tickets are in the second price category, then the second distribution is distributed according to a second price category intra-sharing distribution formula. In one embodiment, the second price category intra-sharing distribution formula requires an even distribution among all the winners in the second price category. In the example above, if two ticket holders 206 have winning ticket numbers, the two ticket holders 206 share the applicable distribution evenly. In the example, the second distribution of the prize or in combination of the first and second distributions was fifty percent. Therefore, the two ticket holders 206 would each receive twenty five percent of the prize. In one embodiment, if the ticket holder 206 is the only winning ticket in the lottery, the second price category intra-sharing distribution formula provides the entirety of the second distribution of the prize to the ticket holder 206. In this example, the ticket holder 206 would receive fifty percent of the jackpot.

In one embodiment, the second price category intra-sharing distribution formula is weighted. The second price category intra-sharing distribution formula can be weighted in a similar manner as the first price category intra-sharing distribution formula. One of ordinary skill in the art will recognize that a variety of formulae can be used for weighting the distribution. The second price category intra-sharing distribution formula can be a variable, a ratio, etc.

In one embodiment, if a ticket holder 204 and a ticket holder 206 have winning lottery tickets, an inter-sharing distribution formula is used to determine how the ticket holder 204 and the ticket holder 206 should share the jackpot. In one embodiment, the lottery operator 102 splits the first distribution so that the ticket holder 204 receives half of the first distribution and the ticket holder 206 receives half of the first distribution. The ticket holder 206 additionally receives the second distribution minus the first distribution. For example, if the first distribution is twenty-five percent and the second distribution is fifty percent, the ticket holder 204 would receive twelve and one-half percent. The ticket holder 206 would receive twelve and one-half percent in addition to twenty-five percent. Therefore, the ticket holder 206 would receive thirty-seven and one-half percent. The inter-sharing distribution formula is not limited to an even distribution. In one embodiment, the inter-sharing distribution formula may be weighted to favor the higher price category. In other words, the ticket holder 206 may be rewarded for purchasing a higher priced ticket. For example, the ticket holder 204 may only receive one-third of the twenty-five percent with the ticket holder 206 receiving two thirds of the twenty-five percent in addition to an entire twenty-five percent.

Although each ticket price is associated with a percentage of the jackpot, the winnings come from a single jackpot. In the example above, even if only one ticket is purchased in the first price category, the ticket holder 204 that has the winning number gets to receive twenty-five percent of a jackpot that may be funded primarily by higher ticket price categories. Variations may occur from lottery to lottery in the numbers of tickets purchased in each price category. The lottery operator 102 increases the chances that the jackpot will be sufficient to cover winnings in each of the price categories by having a single pool from which disbursements are made for winnings in any of the price categories. The use of the single pool for multiple-priced lottery tickets can be used independently of the sharing methodology discussed above. However, the lottery operator 102 can further optimize the performance of the lottery by using the single pool in conjunction with the sharing methodology. Further, the intra-sharing methodology can be used independent of the inter-sharing methodology. However, the lottery operator 102 can optimize performance by using the intra-sharing methodology in conjunction with the inter-sharing methodology.

FIG. 2 also illustrates that a ticket holder 208 can purchase a lottery ticket in a third price category. For instance, the third price category can be lottery tickets purchased for $z. The third price category is associated with a third distribution of a lottery prize that can be won. For example, the ticket holder 208 may have purchased the lottery ticket for three dollars in order to win one hundred percent of the jackpot 104. In one embodiment, if the only winning lottery ticket or winning lottery tickets are in the third price category, then the third distribution is distributed according to a third price category intra-sharing distribution formula. In one embodiment, the third price category intra-sharing distribution formula requires an even distribution among all the winners in the third price category. In the example above, if two ticket holders 208 have winning ticket numbers, the two ticket holders 208 share the third distribution evenly. In the example, the third distribution of the prize was one hundred percent. Therefore, the two ticket holders 208 would each receive fifty percent of the prize. In one embodiment, if the ticket holder 208 has the only winning ticket in the lottery, the third price category intra-sharing distribution formula provides the entirety of the third distribution of the prize to the ticket holder 208. In this example, the ticket holder 208 would receive one hundred percent of the jackpot.

In one embodiment, the third price category intra-sharing distribution formula is weighted. The third price category intra-sharing distribution formula can be weighted in a similar manner as the first price category intra-sharing distribution formula. One of ordinary skill in the art will recognize that a variety of formulae can be used for weighting the distribution. The third price category intra-sharing distribution formula can be a variable, a ratio, etc.

In one embodiment, if the ticket holder 204, the ticket holder 206, and the ticket holder 208 have winning lottery tickets, a first triplet inter-sharing distribution formula is used to determine how the ticket holder 204, the ticket holder 206, and the ticket holder 208 should share the first distribution of the jackpot. In one embodiment, the lottery operator 102 splits the first distribution so that the ticket holder 204 receives one-third of the first distribution, the ticket holder 206 receives one-third of the first distribution, and the ticket holder 208 receives one-third of the first distribution. A second triplet inter-sharing distribution formula is used to determine how the ticket holder 206 and the ticket holder 208 share the second distribution minus the first distribution. In one embodiment, the lottery operator 102 splits the second distribution so that the ticket holder 206 receives one-half of the second distribution and the ticket 208 receives the other-half of the second distribution. The ticket holder 208 additionally receives the third distribution minus the second distribution. For example, if the first distribution is twenty-five percent, the second distribution is fifty percent, and the third distribution is one hundred percent, the ticket holder 204 would receive eight and one-third percent. The ticket holder 206 would receive eight and one-third percent in addition to twelve and one-half percent. Therefore, the ticket holder 206 would receive twenty and five-sixths percent. Finally, the ticket holder 208 would receive eight and one-third percent in addition to twelve and one-half percent in addition to fifty percent. Therefore, the ticket holder 208 would receive seventy and five-sixths percent.

The first triplet inter-sharing distribution formula can require an even distribution of the first distribution. However, in one embodiment, the first inter-sharing distribution formula can be weighted. The ticket holder 206 can be given a greater portion of the first distribution than the ticket holder 204. Further, the ticket holder 208 can be given a greater portion of the first distribution than the ticket holder 206. However, different variations are possible. A volume lottery variable (based, for example on the number of tickets purchased or amount spent on tickets) can be used to determine weighting. In other words, the ticket holder 204 could potentially receive the largest portion of the first distribution if the ticket holder 204 has purchased the most lottery tickets. Further, the ticket holder 204 may receive the largest weighting of the first distribution to give incentive to the ticket holder 204 because the ticket holder 204 does not get to receive a portion of the second distribution or of the third distribution. Even if the ticket holder 204 spent an equivalent or a greater amount on purchasing tickets than the ticket holder 206, the incentive of the ticket holder 206 can be further increased over that of the ticket holder 204. Similarly, the ticket holder 206 may receive a greater weighted portion of the second distribution than the ticket holder 208 because the ticket holder 206 does not receive a portion of the third distribution or for other reasons related to the weighting formula. In one embodiment, the incentive of the ticket holder 208 can be further increased over that of the ticket holder 204. These weighted variations can also be used with the second triplet inter-sharing distribution formula.

The example above discusses the possibility of having one winning ticket from each price category. In one embodiment, multiple ticket winners exist in some or all of the different price categories. A divided intra-sharing distribution within each price category is applied so that winners in each price category split the winnings according to a divided intra-sharing distribution formula. In the example above, the ticket holder 204 received eight and one-third percent. In one embodiment, a first divided intra-sharing distribution formula determines how to split the winnings for the first distribution. For instance, in the example above, if two ticket holders 204 had winning numbers, one of the ticket holders 204 could receive approximately four and sixteen one hundredths percent and the other ticket holder 204 would also receive approximately four and sixteen one hundredths percent. In one embodiment, a second divided intra-sharing distribution formula determines how to split the winnings for the second distribution. For instance, in the example above, if two ticket holders 206 had winning numbers, one of the ticket holders 206 would receive ten and five-twelfths percent and the other ticket holder 206 would also receive ten and five-twelfths percent. In one embodiment, a third divided intra-sharing distribution formula determines how to split the winnings for the third distribution. For instance, in the example above, if two ticket holders 208 had winning numbers, one of the ticket holders 208 would receive thirty five and three twelfths percent while the other one of the ticket holders 208 would also receive thirty five and three twelfths percent. The divided intra-shared distributions do not have to be the same across price categories. Further, within price categories, the divided intra-shared distributions can be weighted as discussed above with respect to the intra-sharing distributions.

Although, in the above discussion, the first price category was associated with the ticket holder 204, the second price category with the ticket holder 206, and the third price category with the ticket holder 208, the ticket holders can be associated with different price categories. For instance, the first price category may be associated with the ticket holder 204 and the third-price category may be associated with the ticket holder 206. The inter-sharing distribution variable as discussed above could be used to share the jackpot if the ticket holder 204 and the ticket holder 206 were the only winning tickets. For instance, the ticket holder 204 would receive one-half of twenty-five percent. The ticket holder 206 would receive one-half of twenty-five percent in addition to seventy-five percent. Further, the methodologies discussed above can be extended to any number of price categories. For instance, there could be a fourth price category. Any number of price categories can be used.

In one embodiment, the shared multiple-priced single pool lottery system 200 can be used with a video lottery game. In another embodiment, the shared multiple-priced single pool lottery system 200 can be used with online lotteries that are provided on a network such as the Internet.

In one embodiment the shared multiple-priced single pool lottery system 300 can be computerized. Software modules can be used to establish and coordinate the multiple-priced single pool lottery system. The use of computerized technologies can help facilitate calculating the sharing distributions. Without the computerized technologies, the quantity of the calculations could be burdensome.

A first price category module can provide a first price category in which a plurality of first price category lottery tickets can be purchased. Further, a second price category module can provide a second price category in which a plurality of second price category lottery tickets can be purchased. In addition, a random number selection module can randomly select the winning lottery number. The random number selection module can be a random number generator, can be coupled to a ball draw machine, or can simulate a ball draw machine. A first price intra-shared distribution module provides a first price category intra-shared distribution of the first distribution of the prize if at least one of the lottery tickets in the plurality of first price category lottery tickets has a winning number. Further, a second price category intra-shared distribution module provides a second price category intra-shared distribution of the second distribution of the prize if at least one of the lottery tickets in the plurality of second price category lottery tickets has a winning number. Additional intra-shared distribution modules can be used for additional price categories.

In one embodiment, a divided first price category intra-shared distribution module provides a divided first price category intra-shared distribution of the first distribution of the prize. In addition, a divided second price category intra-shared distribution module provides a divided second price category intra-shared distribution of the second distribution. An inter-shared distribution module provides an inter-shared distribution of the first distribution of the prize if at least one of the lottery tickets in the plurality of first price category lottery tickets has a winning number and if at least one of the lottery tickets in the plurality of second price category lottery tickets has a winning number.

Figure 3:
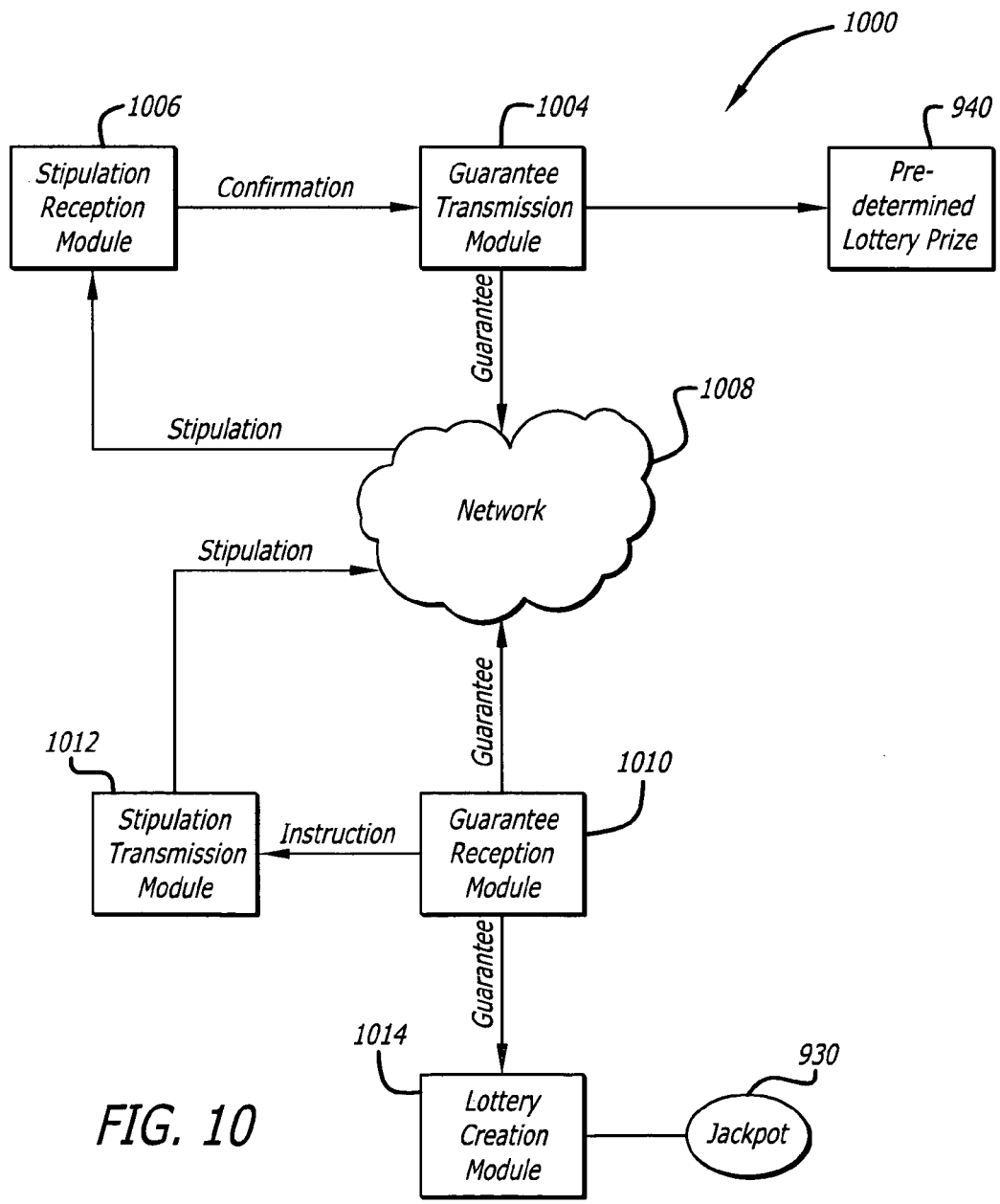
FIG. 3 illustrates an example of a winnings table for the shared multiple-priced single-pool lottery system of FIG. 2.

FIG. 3 illustrates an example of a winnings table 300 for the shared multiple priced single pool lottery system of FIG. 2. For example, a lottery can have a jackpot of ten million dollars. Lottery players can purchase a one-dollar ticket, a two-dollar ticket, and a three-dollar ticket. The one-dollar ticket only gives the ticket holder a chance at receiving twenty-five percent of the jackpot. Therefore, the one dollar ticket holder could at best receive two million five hundred thousand dollars if the one dollar ticket holder did not have to share the jackpot with any other winners. The two-dollar ticket holder could at best receive five million dollars if the two-dollar ticket holder does not have to share the jackpot with any other ticket holders. Finally, the three-dollar ticket holder could at best receive the full jackpot of ten million dollars if the three-dollar ticket holder does not have to share the jackpot with any other ticket holders.

Figure 4:
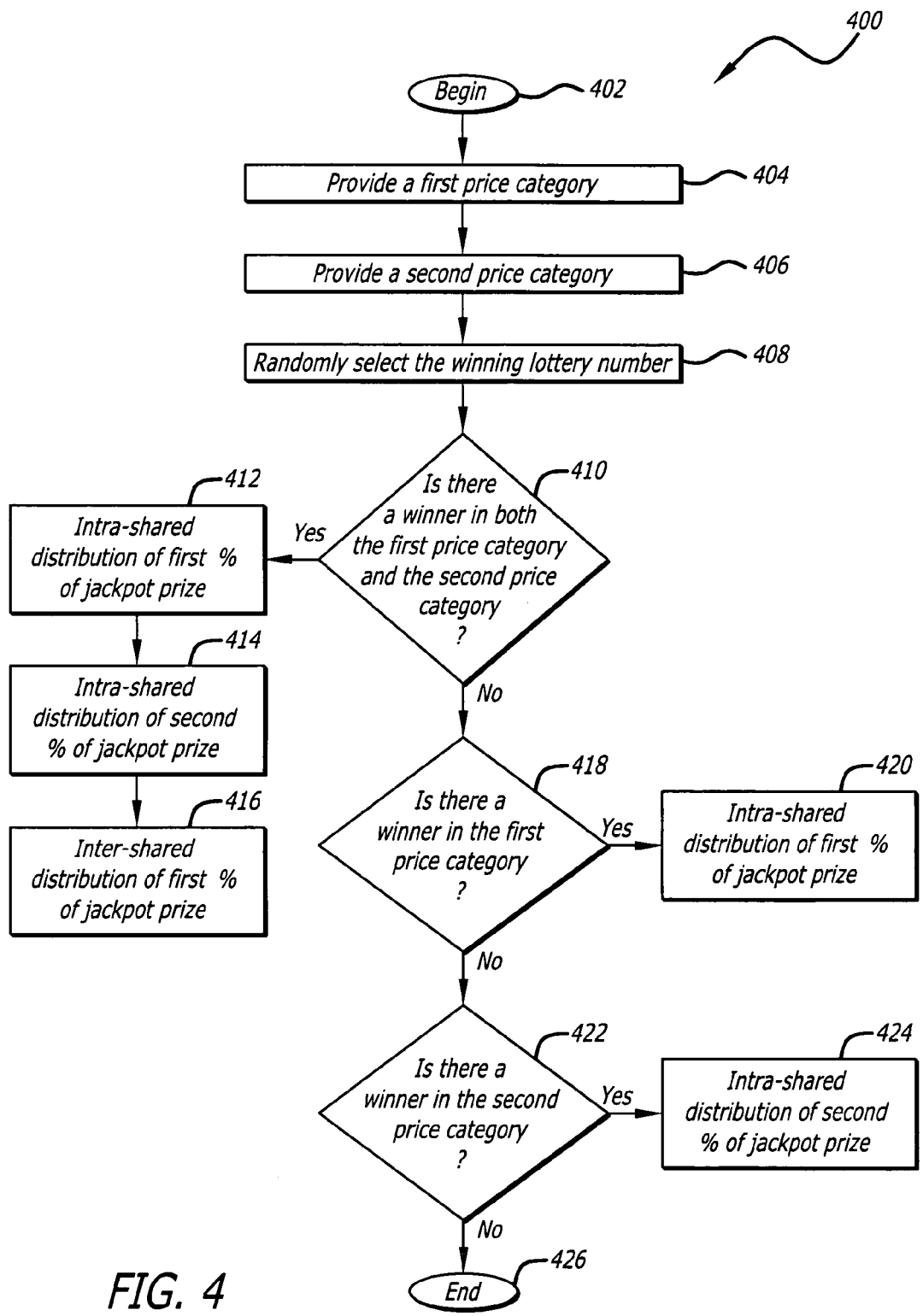
FIG. 4 illustrates a process that can be used with the shared multiple-priced single-pool lottery system illustrated in FIG. 2.

FIG. 4 illustrates a process 400 that can be used with the shared multiple priced single pool lottery system 200 illustrated in FIG. 2. The process 400 begins at a process block 402. The process 400 advances to a process block 404 to provide a first price category. Further, the process 400 then advances to a process block 406 to provide a second price category. The process then advances to a process block 408 to randomly select the winning lottery number. The process 400 then advances to a decision block 410 where it is determined whether there is a winner in both the first price category and the second price category. If there is a winner in both the first price category and the second price category, then the process 400 advances to a process block 412 where the first distribution of the jackpot prize is distributed through an intra-shared distribution as discussed in FIG. 2. The process 400 then advances to a process block 414 where the second distribution of the jackpot prize is distributed through an intra-shared distribution as discussed in FIG. 2. The process 400 then advances to a process block 416 where the first distribution is distributed through an inter-shared distribution of the jackpot so that the winning ticket holders in the second price category receive the appropriate share of the first distribution.

If the decision block 410 determines that there is not both a winner in the first price category and a winner in the second price category, the process 400 advances to a decision block 418. At the decision block 418, the process 400 determines if there is a winner in the first price category. If there is a winner in the first price category, the process 400 advances to a process block 420 where the process 400 distributes the jackpot prize through an intra-shared distribution to a winner or winners in the first price category. If the decision block 418 determines that there is not a winner in the first price category, the process 400 advances to a decision block 422 to determine if there is a winner in the second price category. If there is a winner in the second price category, the process 400 advances to a process block 424 where the process 400 distributes the jackpot prize through an intra-shared distribution to winners in the second price category. If there is not a winner in the second price category, the process 400 determines that there are not any winners and the process ends at process block 426. In one embodiment, there is a roll over. In one embodiment, the undistributed jackpot is used in a future draw. In one embodiment, the roll over includes a percentage of the jackpot for use in a future draw. In one embodiment, the lottery operator 102 takes a percentage of the ticket sales revenue and adds that percentage to a future lottery jackpot even if there is a winner in the present jackpot. The process 400 can be extended to cover three price categories. Further, the process 400 can be extended to cover any number of price categories. In one embodiment, the process 400 can be implemented on a computer readable medium.

Figure 5:
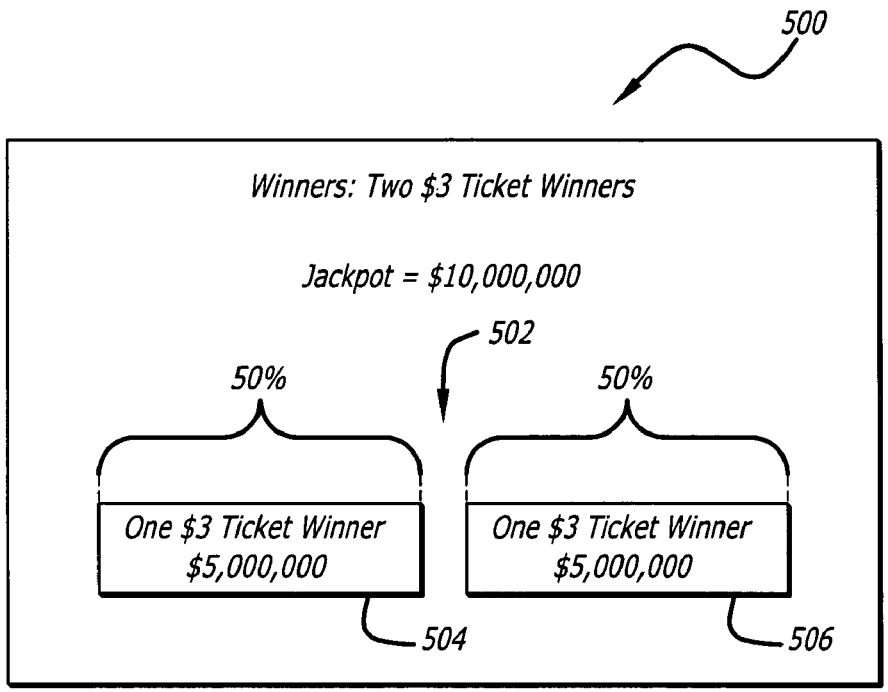
FIG. 5 illustrates an example of a winnings table of a lottery having two three-dollar ticket winners.

FIGS. 5 through 8 illustrate various examples of the multiple-priced single-prize lottery system 200. FIG. 5 illustrates an example of a winnings table 500 of a lottery having two three-dollar ticket winners. The jackpot is for ten million dollars. The distribution displays one three-dollar ticket winner sharing the ten million dollar jackpot with another three-dollar ticket winner through an intra-sharing distribution. One of the three-dollar ticket winners receives five million dollars at a sharing section 504. Further, the other three-dollar ticket winner receives five million dollars at a sharing section 506.

Figure 6:
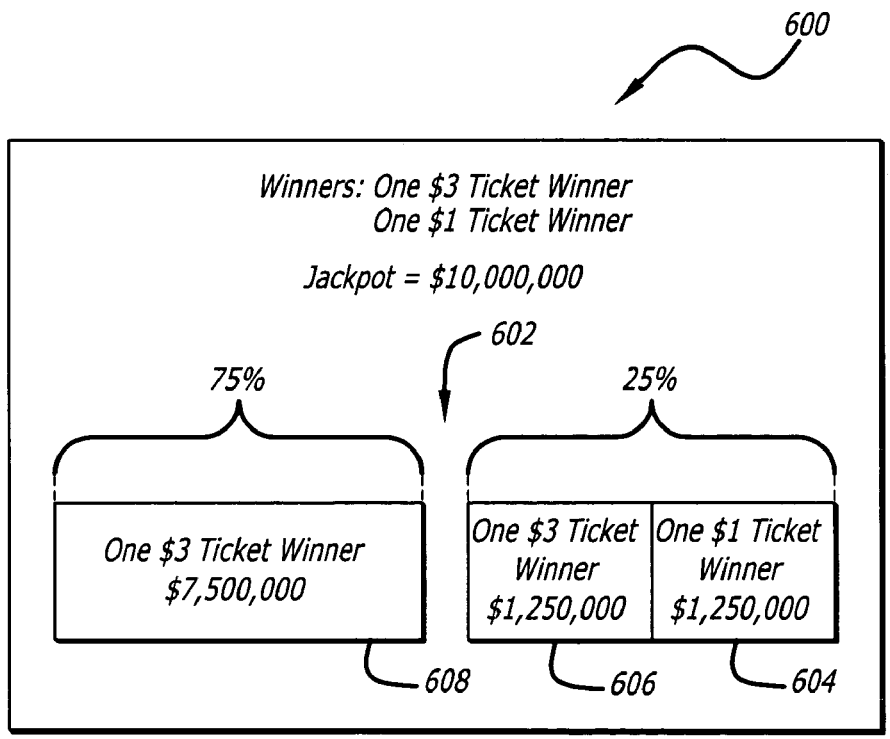
FIG. 6 illustrates an example of a winnings table of a lottery having one three-dollar ticket winner and one one-dollar ticket winner.

FIG. 6 illustrates an example of a winnings table 600 of a lottery having one three-dollar ticket winner and one one-dollar ticket winner. The jackpot is for ten million dollars. The distribution 602 displays one three-dollar ticket winner that shares the jackpot with one one-dollar ticket winner. The one dollar ticket winner receives one million two hundred fifty thousand dollars at a section 604 through an inter-sharing distribution. Further, the three-dollar ticket winner receives one million two hundred fifty thousand dollars through an inter-sharing distribution at an inter-sharing section 606. Finally, the three-dollar ticket winner receives seven million five hundred thousand dollars at a section 608 through an intra-shared distribution.

Figure 7:
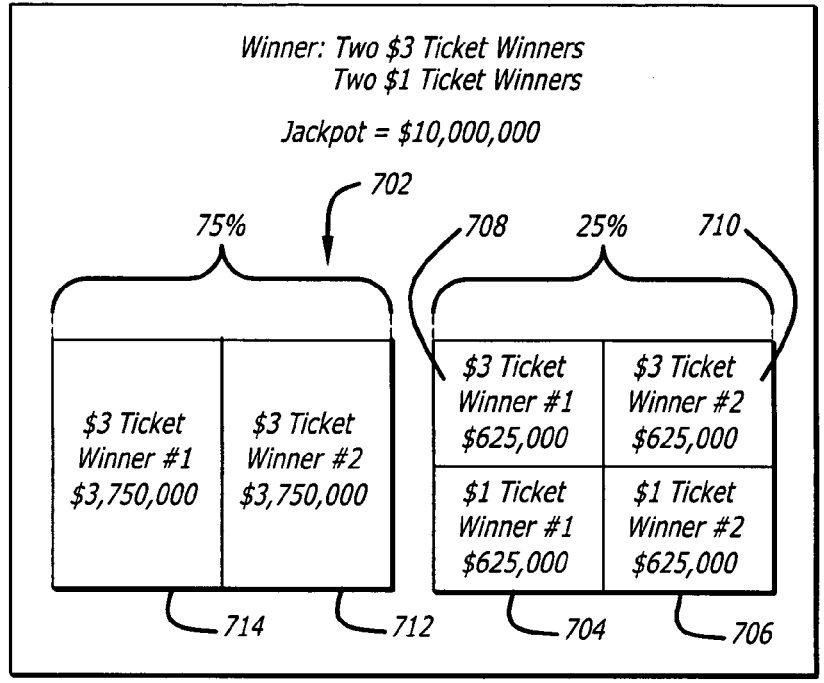
FIG. 7 illustrates an example of a winnings table of a lottery having two three-dollar ticket winners and two one-dollar ticket winners.

FIG. 7 illustrates an example of a winnings table 700 of a lottery having two three-dollar ticket winners and two one-dollar ticket winners. The jackpot is for ten million dollars. A distribution 702 displays a one-dollar winner receiving six hundred twenty-five thousand dollars at a section 704, a one-dollar winner receiving six hundred twenty-five thousand dollars at a section 706, a three-dollar winner receiving six hundred twenty-five thousand dollars at a section 708, and a three-dollar winner receiving six hundred twenty-five thousand dollars at a section 710. The one-dollar ticket winners receive their winnings through an intra-shared distribution. Further, the three-dollar ticket winners receive a portion of the twenty-five percent associated with the first price category through an inter-shared distribution of half. [This repeats prior clause so deleted.] Further, each of the three-dollar ticket holders receives an additional three million seven hundred fifty thousand dollars through an intra-shared distribution of the one hundred percent minus the twenty-five percent.

Figure 8:
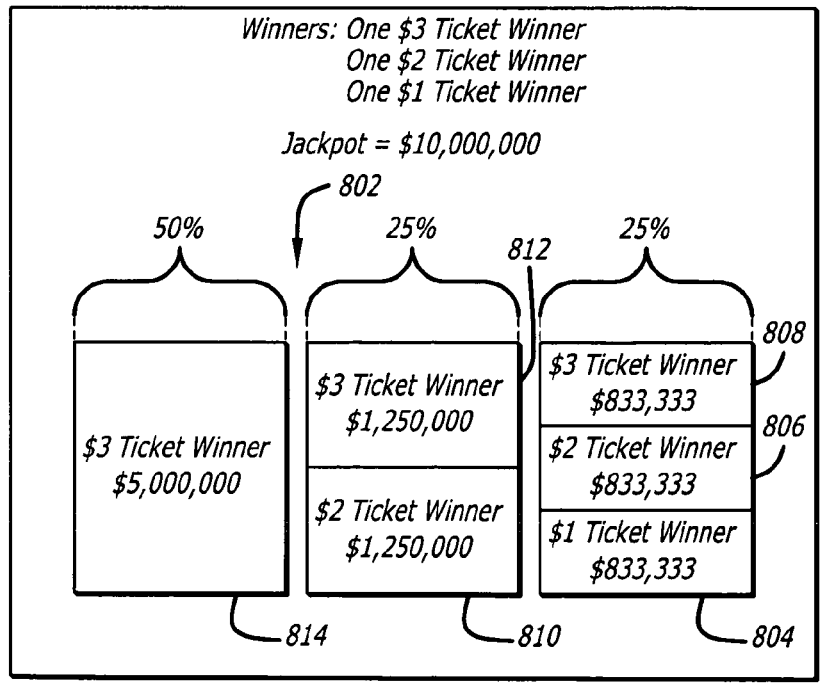
FIG. 8 illustrates an example of a winnings table of a lottery having one three-dollar ticket winner, one two-dollar ticket winner, and one one-dollar ticket winner.

FIG. 8 illustrates an example of a winnings table 800 of a lottery having one three-dollar ticket winner, one two-dollar ticket winner, and one one-dollar ticket winner. The jackpot is for ten million dollars. A distribution 802 displays a one-dollar winner receiving eight hundred thirty three thousand dollars in a section 804 according to an inter-shared distribution of twenty-five percent of the jackpot. The two-dollar ticket holder also receives eight hundred thirty three thousand dollars in a section 806 according to the inter-shared distribution of twenty-five percent of the jackpot. Accordingly, the three-dollar ticket holder also receives eight hundred thirty three thousand dollars in a section 808 according to the inter-shared distribution of twenty-five percent of the jackpot. Further, the two-dollar ticket holder receives an additional one million two hundred fifty thousand dollars at a sharing section 810 through an inter-shared distribution of the second distribution. In addition, the three-dollar ticket holder receives an additional one million two hundred fifty thousand dollars at a sharing section 812 through an inter-shared distribution of the second distribution. Finally, the three-dollar ticket holder receives an additional five million dollars at a section 814 because the third distribution minus the second distribution equals fifty percent. In one embodiment, the ticket holder in the highest price category receives the distribution associated with the highest price category minus the next highest distribution with an inter-sharing distribution. Intra-sharing distribution may occur in this remainder. Alternative embodiments will allow for different methodologies for calculating the remainder.

Figure 9:
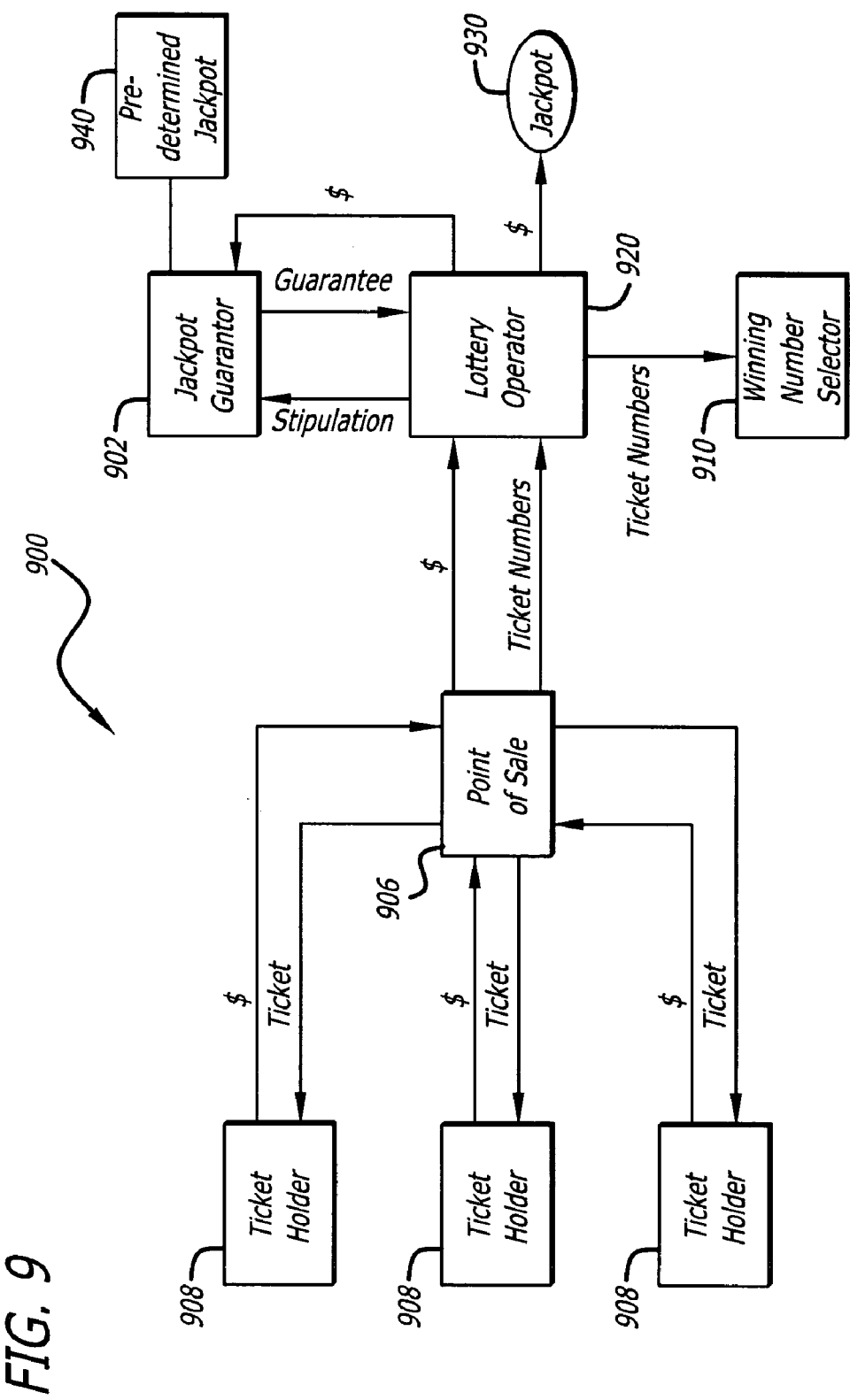
FIG. 9 illustrates a probabilistic lottery system.

FIG. 9 illustrates a probabilistic lottery system 900. The multiple-priced shared lottery system 200 can be used in conjunction with the probabilistic lottery system 900. A jackpot guarantor 902.assumes the risk that would normally not exist in a pure pari-mutuel lottery or might be assumed in whole or in part by the lottery operator 920. In one embodiment, the jackpot guarantor 902 is a private organization other than a jurisdiction. In another embodiment, the jackpot guarantor is a publicly held company other than a jurisdiction. The jackpot guarantor 902 establishes a pre-determined jackpot 940. In one embodiment, the pre-determined jackpot 204 is a very large prize that will entice ticket holders 108 that would not normally purchase a lottery ticket to do so. The lottery operator 920 can advertise the pre-determined jackpot 204 in order to stimulate and increase ticket sales. In one embodiment, the pre-determined jackpot 940 is unfunded. Instead, the jackpot guarantor 902 sets the pre-determined jackpot 940 at an amount that is large enough so that there is a probability that the allocable prize portion of ticket sales will equal or exceed the pre-determined jackpot 940. If the allocable prize portion of ticket sales is less than the pre-determined jackpot 940, the jackpot guarantor 902 assumes the risk for paying the differential between the ticket sales and the pre-determined jackpot 930.

In one embodiment, the jackpot guarantor 902 provides a guarantee to the lottery operator 920. In one embodiment, the guarantee provides that the jackpot guarantor 902 assumes the risk for paying the pre-determined jackpot if the allocable prize portion of ticket sales is not sufficient to cover the pre-determined jackpot. In another embodiment, the guarantee provides that the jackpot guarantor assumes the risk of paying a portion of the pre-determined amount of any secondary prizes that are won to the extent that the allocable prize portion of ticket sales is not sufficient.

In one embodiment, the jackpot guarantor 902 provides the guarantee in exchange for a stipulation. In one embodiment, the stipulation includes an obligation by the lottery operator 920 to provide a percentage of revenue generated from future ticket sales in exchange for the guarantee. In another embodiment, the stipulation includes an obligation by the lottery operator 920 to provide a fee in exchange for the guarantee.

The lottery operator 920 receives payments for ticket sales from the point of sale 106. Further, the lottery operator 920 receives ticket numbers from the tickets sold to the ticket holders 108 from the point of sale 906. The lottery operator provides the ticket numbers to the winning number selector 910 to determine which are winning tickets.

In one embodiment, the jackpot guarantor 902 allocates the funds to the pre-determined jackpot 940 pool. In one embodiment, the entity has set aside the large prize in a protected account to provide for payment. Therefore, the lottery operator can advertise a large prize because another entity actually has set aside the large prize.

FIG. 10 illustrates a probabilistic software configuration 1000 that can be used with the probabilistic lottery system in conjunction with the multiple pricing shared lottery system 200. As can be seen from FIG. 10, the probabilistic software configuration 1000 includes software for establishing a guarantee for a pre-determined lottery prize 940. A guarantee transmission module 404 transmits the guarantee through a network 1008. The network 1008 can be a wide area network, a local area network, the network, a wireless network, or any other network known to one of ordinary skill in the art. The guarantee transmission module 1004 transmits the guarantee in exchange for a stipulation. In one embodiment, the stipulation can be an obligation for a percentage of future ticket sales. A stipulation reception module 1006 receives the stipulation through the network 408. In one embodiment, after the stipulation reception module 1006 receives the stipulation, the stipulation reception module 1006 transmits a confirmation that the stipulation was received to the guarantee transmission module 1004.

A guarantee reception module 1010 receives the guarantee from the network 1008. In one embodiment, upon receiving the guarantee, the guarantee reception module 1010 provides an instruction to a stipulation transmission module 1012. The stipulation transmission module 1012 then sends the stipulation through the network 1008. As discussed above, the stipulation reception module 1006 can receive the stipulation and send the confirmation to the guarantee transmission module 1004 that the guarantee has been sent and the stipulation, in exchange for which the guarantee was sent, has been received.

Figure 11:
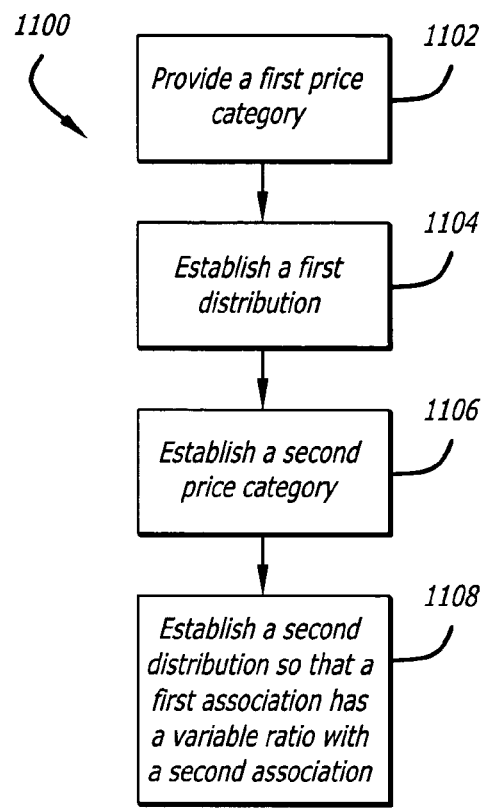
FIG. 11 illustrates a method for conducting a variable ratio based multiple-priced lottery system.

FIG. 11 illustrates a method 1100 for conducting a variable ratio based multiple pricing lottery system. The terms "variable" and "constant" will be explained in the following discussion.

In one embodiment, the multiple pricing system as discussed above can be implemented with a constant ratio based system. For example, a lottery player can purchase a one-dollar ticket in the hope of winning a lottery distribution of ten million dollars. The lottery player can also purchase a two-dollar ticket in the hope of winning a lottery distribution of twenty million dollars. A first association between the price category of one dollar and the distribution of ten million dollars can be the quotient of ten million divided by one, which equals ten million. Similarly, a second association between the price category of two dollars and the distribution of twenty million dollars can be the quotient of twenty million divided by two, which equals ten million. A constant ratio exists when the first association equals the second association. In one embodiment, a lottery player can purchase one two-dollar ticket as opposed to two one-dollar tickets to avoid having to purchase multiple tickets.

In one embodiment, the multiple pricing system as discussed above can be implemented to induce the purchase of higher priced lottery tickets. For example, a lottery player can purchase a one-dollar ticket in the hope of winning a lottery distribution of ten million dollars. The lottery player can also purchase a two-dollar ticket in the hope of winning a lottery distribution of thirty million dollars. The first association equals ten million (ten million divided by one) and the second association equals fifteen million (thirty million divided by two). A variable ratio exists because the first association does not equal the second association. In one embodiment, this variable ratio provides the lottery player with incentive to purchase a two-dollar ticket. In one embodiment, the lottery ticket holder can purchase the two-dollar ticket as opposed to two one-dollar tickets because the potential distribution is greater by purchasing the two-dollar ticket as opposed to the two one-dollar tickets.

In one embodiment, the association is evaluated by dividing the total distribution by the associated price category. If multiple players share in that distribution, the association is still evaluated by dividing the total distribution by the associated price category. For instance, if two one-dollar ticket holders win and share in the distribution of ten million dollars, the ten million dollars is the number that is divided by the price category (one dollar) to determine the first association. In another embodiment, a ticket holder in another price category (e.g., three dollar) shares the ten million dollar distribution with the winners in the first price category. Even in this situation, the ten million dollars is the number that is divided by the price category (one dollar) to determine the first association. In one embodiment, the potential distribution is the distribution that is divided by the price category to determine the association.

The method 1100 begins at a process block 1102 where a first price category is provided. A plurality of first price category lottery tickets can be purchased in the first price category. The method 1100 then advances to a process block 1104 where a first distribution is established. The first distribution can be won with the lottery tickets in the plurality of first price category lottery tickets having a winning lottery number. The method 1100 next advances to a process block 1106 where a second price category is established. A plurality of second price category lottery tickets can be purchased in the second price category. Finally, the method 1100 advances to a process block 1108 where a second distribution is established so that a first association has a variable ratio with a second association.

Figure 12:
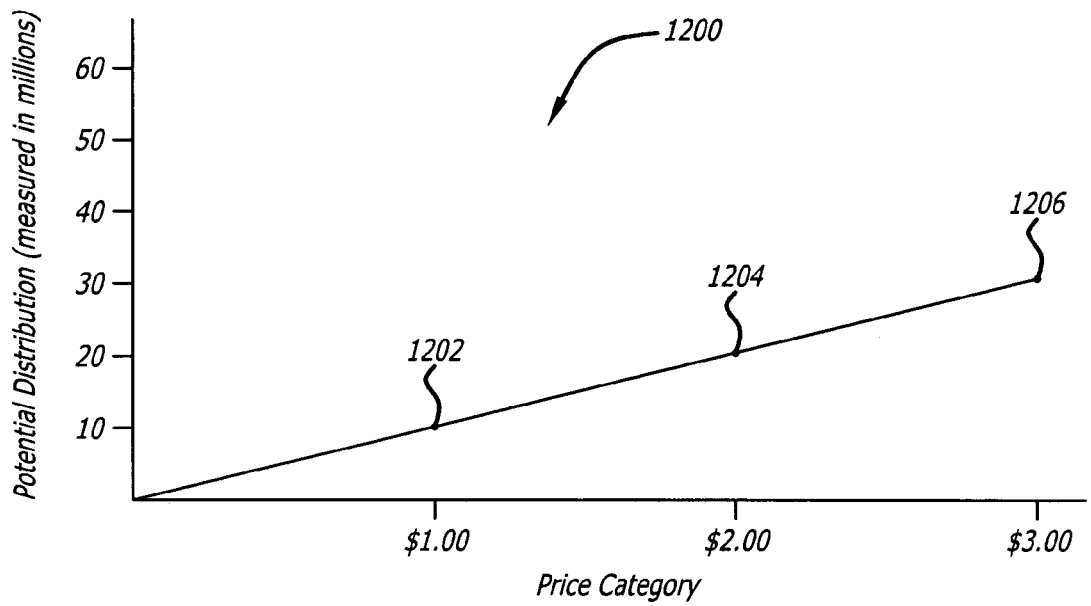
FIG. 12 illustrates a graph for a constant ratio between associations.

FIG. 12 illustrates a graph 1200 for a constant ratio between associations. The graph 1200 illustrates the potential distribution on the y-axis for a price category listed on the x-axis. In one embodiment, a first point 1202 is plotted to illustrate that a potential distribution of ten million dollars can be won for a first price category of one-dollar tickets. The lottery ticket purchaser in the first price category may not actually win the full ten million dollars if there are other winners in the first price category or other price categories for which the lottery ticket purchaser must share the distribution. The second point 1204 is plotted to illustrate that a potential distribution of twenty million dollars can be won for a second price category for two-dollar tickets. Finally, the third point 1206 is plotted to illustrate that a potential distribution of thirty million dollars can be won for a third price category for three-dollar tickets.

In order to determine a first association and a second association in the graph 1200, any two of the plotted points can be chosen. For instance, the first point 1202 can be used to determine the first association. In one embodiment, the first potential distribution of ten million dollars is divided by the first price category of one dollar to result in the first association being ten million. The second point 1204 can be used to determine the second association. In one embodiment, the second potential distribution of twenty million dollars is divided by the second price category of two dollars to result in the second association being ten million. The second association minus the first association equals zero. In other words, the first association equals the second association. Therefore, a constant ratio exists between the first association and the second association. The graph 1200 illustrates this constant ratio by displaying a straight line between the first point 1202 and the second point 1204.

Any two points in the graph 1200 can be used to determine the first association and the second association. For instance, the second point 1204 can be used to determine the first association and the third point 1206 can be used to determine the second association. In this instance, a constant ratio also exists between the first association and the second association. The first and the third points can also be used as the first and the second associations. Alternatively, the points can even be used backwards for associations. For instance, the third point can be the first association and the first point can be the second association. Similarly, the second point can be the first association and the first point can be the second association.

Figure 13:
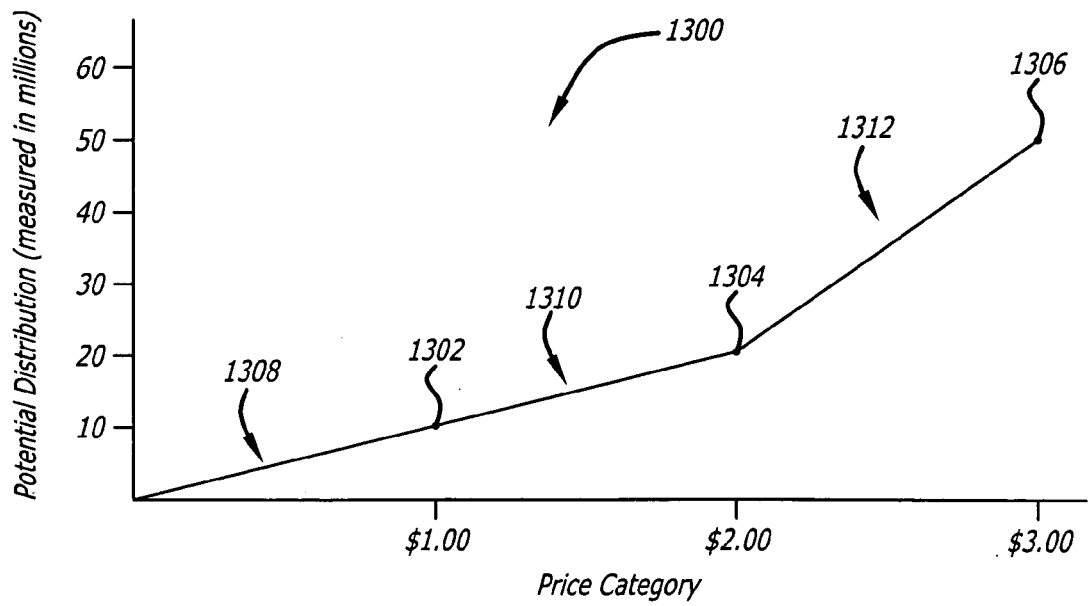
FIG. 13 illustrates a graph in which a variable ratio exists between at least two associations.

FIG. 13 illustrates a graph 1300 in which a variable ratio exists between at least two associations. A first point 1302 is plotted to illustrate a potential distribution of ten million dollars that can be won in the first price category. A second point 1304 is plotted to illustrate a potential distribution of twenty million dollars that can be won in the second price category. The first association is ten million (ten million dollars divided by the one-dollar price category) and the second association is ten million (twenty million dollars divided by the two-dollar price category). Therefore, a constant ratio exists between the first association and the second association.

In other words, an origin line 1308, which connects the origin with the first point 1302, has an equal slope to a first line 1310, which connects the first point 1302 with the second point, 1304. In one embodiment, the slope does not have to be identical but rather approximately the same to be considered a constant ratio.

However, a variable ratio exists between the first association and the second association when the reference points are the second point 1304 and a third point 1306. The first association is ten million (ten million dollars divided by the one-dollar price category) and the second association is twenty five million (fifty million dollars divided by the two dollar price category). The second association minus the first association equals fifteen million (twenty five million minus ten million). A variable ratio exists between the first association and the second association when the reference points are the second point 1304 and the third point 1306 because the second association minus the first association is a positive number. The variable ratio is depicted in the graph 1300 because a second line 1312 is displayed between the second point 1304 and the third point 1306, which has a different slope than the origin line 1308 or the first line 1310. In one embodiment, a variable ratio would exist between the first association and the second association if the second association minus the first association equals a negative number.

The entire graph may be but is not necessarily entirely constant. For instance, the graph 1300 depicts a constant ratio and a variable ratio. A purchaser of a lottery ticket is provided with an added incentive to purchase a lottery ticket when a variable ratio exists. For instance, the purchaser can purchase a one-dollar ticket to potentially win ten million dollars. The purchaser could purchase two one-dollar tickets or one two-dollar ticket to potentially win twenty million dollars. In one embodiment, the purchaser receives a benefit in purchasing the two-dollar ticket if the purchaser is not the sole winner and has to share the distribution. The two-dollar ticket could potentially end up with a larger share than the two one-dollar ticket winners according to the sharing formulae as discussed above. Whether a sole winner or a shared winner, the purchaser can win a potentially greater distribution by purchasing one three-dollar ticket rather than purchasing three one-dollar tickets. If the purchaser was the sole winner, the purchaser of the three-dollar ticket could potentially win fifty million dollars. On the other hand, if that purchaser instead purchased three one-dollar tickets, the purchaser could at most potentially win ten million dollars. Whether the purchaser has one one-dollar ticket that has a winning number or three one-dollar tickets with winning numbers, the purchaser of the one-dollar ticket can only win in the first price category. The purchaser would share winnings with himself if he or she had multiple one-dollar tickets with winning numbers. Therefore, purchasers are more likely to purchase higher-priced lottery tickets thereby leading to an increase in lottery ticket sales revenues.

Figure 14:
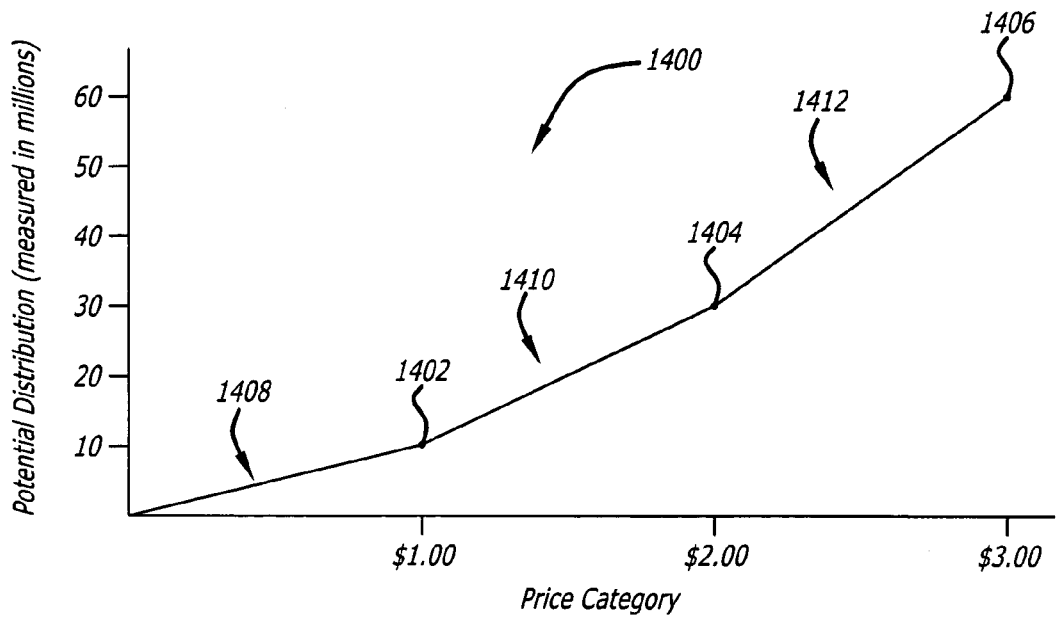
FIG. 14 illustrates a graph in which two different variable ratios exist.

FIG. 14 illustrates a graph 1400 in which two different variable ratios exist. A first point 1402 is plotted to illustrate a potential distribution of ten million dollars that can be won in the first price category. A second point 1404 is plotted to illustrate a potential distribution of thirty million dollars that can be won in the second price category. The first association is ten million (ten million dollars divided by the one-dollar price category) and the second association is fifteen million (thirty million dollars divided by the two-dollar price category). The second association minus the first association equals five million (fifteen million minus ten million). Therefore, a variable ratio exists between the first association and the second association. In addition, a variable ratio exists between the first association and the second association when the reference points are the second point 1404 and a third point 1406. The first association is fifteen million (thirty million dollars divided by the two-dollar price category) and the second association is twenty million (sixty million dollars divided by the three-dollar price category). The second association minus the first association equals five million (twenty million minus fifteen million). These variable ratios are depicted in the graph 1400 because a first line 1410 is depicted between the first point 1402 and the second point 1404, and a second line 1412 is depicted between the second point 1404 and the third point 1406. The first line 1410 has a greater slope than an origin line 1408 that is depicted from the origin to the first point 1402 because there is more incentive for a purchaser of a ticket to purchase a two-dollar ticket than a one-dollar ticket. One of ordinary skill in the art will recognize that the term "origin" refers to the point on a graph that has an x-coordinate of zero and a y-coordinate of zero. Further, the second line 1412 has a greater slope than the first line 1410, thereby illustrating that a purchaser of a ticket has more incentive to purchase a three-dollar ticket than a two-dollar ticket.

In one embodiment, the potential distributions are not limited to specific ratios. For instance, the potential distributions can be established according to a constant ratio, a variable ratio, or a combination of a constant ratio and a variable ratio.

While the above description contains many specifics, these should not be construed as limitations on the scope of the invention, but rather as an exemplification of preferred embodiments thereof. The invention includes any combination or subcombination of the elements from the different species and/or embodiments disclosed herein. One skilled in the art will recognize that these features, and thus the scope of the present invention, should be interpreted in light of the following claims and any equivalents thereto.

We claim:

1. A method comprising:
providing, with a computer, a first lottery ticket price in which a plurality of first lottery ticket price lottery tickets can be purchased;
establishing, with the computer, a first known potential distribution of a prize that a player can win with a first lottery ticket price lottery ticket having a winning lottery number;
providing, with the computer, a second lottery ticket price in which a plurality of second lottery ticket price lottery tickets can be purchased, wherein the second lottery ticket price is greater than the first lottery ticket price; and
establishing, with the computer, a second known potential distribution of the prize that a player can win with a winning second lottery ticket price lottery ticket having the winning lottery number, wherein the second known potential distribution is determined so that a first association being subtracted from a second association results in a fixed non-zero value, wherein the first association equals the first distribution divided by the first lottery ticket price and the second association equals the second distribution divided by the second lottery ticket price, a sum of the first known potential distribution of the prize and the second known potential distribution of the prize being greater than the prize; and
provide a distribution of the prize to the player based on a lottery ticket price at which the player purchased a lottery ticket if a lottery ticket number corresponding to the lottery ticket equals the winning lottery ticket number.

2. The method of claim 1, further comprising randomly selecting the winning lottery number.

3. The method of claim 1, wherein the prize is a single shared jackpot prize.

4. The method of claim 1, further comprising providing, with the computer, a third lottery ticket price in which a plurality of third lottery ticket price lottery tickets can be purchased.

5. The method of claim 4, further comprising establishing a third known potential distribution that a player can win with a winning third lottery ticket price lottery ticket having the winning lottery number, wherein the third known potential distribution is determined so that the first association subtracted from a third association results in a fixed zero value, wherein the third association equals the third distribution divided by the third lottery ticket price.

6. The method of claim 5, wherein the third known potential distribution is a total distribution that is shared by holders of third lottery ticket price lottery tickets having the winning lottery number.

7. The method of claim 4, wherein the prize is a single shared jackpot prize.

8. The method of claim 4, wherein the third lottery ticket price is greater than each of the first lottery ticket price and the second lottery ticket price.

9. The method of claim 4, further comprising establishing a third known potential distribution that a player can win with a winning third lottery ticket price lottery ticket having the winning lottery number, wherein the third known potential distribution is determined so that the second association subtracted from a third association results in a fixed zero value, wherein the third association equals the third distribution divided by the third lottery ticket price.

10. A method comprising:
providing, with a computer, a first lottery ticket price in which a plurality of first lottery ticket price lottery tickets can be purchased;
establishing, with the computer, a first known potential distribution of a prize that a player can win with a first lottery ticket price lottery ticket having a winning lottery number;
providing, with the computer, a second lottery ticket price in which a plurality of second lottery ticket price lottery tickets can be purchased, wherein the second lottery ticket price is greater than the first lottery ticket price;
establishing, with the computer, a second known potential distribution that a player can win with a winning second lottery ticket price lottery ticket having the a winning lottery number, wherein the second known potential distribution is determined so that a first association being subtracted from a second association results in a fixed non-zero value, wherein the first association equals the first distribution divided by the first lottery ticket price and the second association equals the second distribution divided by the second lottery ticket price, a sum of the first known potential distribution of the prize and the second known potential distribution of the prize being greater than the prize; and
randomly selecting the winning lottery number;
providing a first lottery ticket price intra-shared distribution of the first known potential distribution of the prize if more than one of the first lottery ticket price lottery tickets has the winning lottery number and the more than one of the first lottery ticket price lottery tickets are the only lottery tickets with the winning lottery number, wherein each of the more than one of the first lottery ticket price lottery tickets with the winning lottery number shares actual payout of the prize according to a first lottery ticket price intra-sharing distribution formula; and providing a second lottery ticket price intra-shared distribution of the second known potential distribution of the prize if more than one of the second lottery ticket price lottery tickets has the winning lottery number and the more than one of the second lottery ticket price lottery tickets are the only lottery tickets with the winning lottery number, wherein each of the more than one of the first lottery ticket price lottery tickets with the winning lottery number shares actual payout of the prize according to a second lottery ticket price intra-sharing distribution formula.

11. The method of claim 10, wherein the first lottery ticket price intra-sharing distribution formula is an equal distribution.

12. The method of claim 10, wherein the second lottery ticket price intra-sharing distribution formula is an equal distribution.

13. The method of claim 10, further comprising utilizing an intra-sharing formula and an inter-sharing formula if at least one of the first lottery ticket price lottery tickets has the winning lottery number and if at least one of the second lottery ticket price lottery tickets has the winning lottery number.

14. The method of claim 10, further comprising utilizing an intra-sharing formula and an inter-sharing formula if more than one of the first lottery ticket price lottery tickets has the winning lottery number and if more than one of the second lottery ticket price lottery tickets has the winning lottery number.

15. The method of claim 10, further comprising providing a third lottery ticket price in which a plurality of third lottery ticket price lottery tickets can be purchased and establishing a third known potential distribution of the prize that a player can win with a third lottery ticket price lottery ticket having the winning lottery number.

16. The method of claim 15, further comprising providing a third lottery ticket price intra-shared distribution of the third distribution if more than one of the third lottery ticket price lottery tickets has the winning lottery number and the more than one of the third lottery ticket price lottery tickets are the only lottery tickets with the winning lottery number, wherein each of the more than one of the third lottery ticket price lottery tickets with the winning lottery number shares the third distribution according to a third lottery ticket price intra-sharing distribution formula.

17. The method of claim 10, wherein the first known potential distribution of the prize is a total distribution that is shared by holders of first lottery ticket price lottery tickets having the winning lottery number.

18. The method of claim 10, wherein the second known potential distribution of the prize is a total distribution that is shared by holders of second lottery ticket price lottery tickets having the winning lottery number.

19. The method of claim 10, wherein the prize is a single shared jackpot prize.

20. The method of claim 10, further comprising providing a third price category in which a plurality of third price category lottery tickets can be purchased and establishing a third known potential distribution of the prize that a player can win with a winning third lottery ticket price lottery ticket having the winning lottery number, wherein the third known potential distribution of the prize is determined so that the first association subtracted from a third association results in a fixed zero value, wherein the third association equals the third known potential distribution of the prize divided by the third lottery ticket price.

21. The method of claim 20, wherein the third known potential distribution of the prize is the total distribution that is shared by holders of third lottery ticket price lottery tickets having the winning lottery number.

22. The method of claim 20, wherein the prize is a single shared jackpot prize.

23. The method of claim 20, wherein the third lottery ticket price is greater than each of the first lottery ticket price and the second lottery ticket price.

24. The method of claim 20, further comprising establishing a third known potential distribution of the prize that a player can win with a winning third lottery ticket price lottery ticket having the winning lottery number, wherein the third known potential distribution of the prize is determined so that the second association subtracted from a third association results in a fixed zero value, wherein the third association equals the third distribution divided by the third lottery ticket price.

25. The method of claim 1, wherein an inter-sharing formula is utilized to provide payouts of actual distributions of the prize to multiple players that each have the selection of the virtual lottery ticket number that equals the winning virtual lottery ticket number.

26. The method of claim 1, wherein an intra-sharing formula is utilized to provide payouts of actual distributions of the prize to multiple players that each have the selection of the virtual lottery ticket number that equals the winning virtual lottery ticket number.

27. The method of claim 1, wherein an inter-sharing formula and an intra-sharing formula are utilized to provide payouts of actual distributions of the prize to multiple players that each have the selection of the virtual lottery ticket number that equals the winning virtual lottery ticket number.

28. The method of claim 1, wherein the first known potential distribution of the prize is determined based on a potential single winner.

29. The method of claim 1, wherein the second known potential distribution of the prize is determined based on a potential single winner.

* * * * *